US008576588B2

(12) United States Patent
Kuang et al.

(10) Patent No.: US 8,576,588 B2
(45) Date of Patent: Nov. 5, 2013

(54) SWITCHING MODE POWER SUPPLY WITH PRIMARY SIDE CONTROL

(75) Inventors: Naixing Kuang, Hangzhou (CN); Lei Du, Hangzhou (CN); Junming Zhang, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 296 days.

(21) Appl. No.: 13/016,592

(22) Filed: Jan. 28, 2011

(65) Prior Publication Data

US 2011/0199793 A1 Aug. 18, 2011

(30) Foreign Application Priority Data

Jan. 29, 2010 (CN) .......................... 2010 1 0115327

(51) Int. Cl.
*H02M 3/335* (2006.01)

(52) U.S. Cl.
USPC .................. 363/21.16; 363/21.13; 363/21.17; 363/21.18

(58) Field of Classification Search
USPC ........................................... 363/21.12–21.18
See application file for complete search history.

(56) References Cited

U.S. PATENT DOCUMENTS

| | | | | |
|---|---|---|---|---|
| 8,077,488 | B2 * | 12/2011 | Tamaki | 363/21.16 |
| 8,199,538 | B2 * | 6/2012 | Piper | 363/21.18 |
| 8,199,539 | B2 * | 6/2012 | Wang et al. | 363/21.18 |
| 8,233,292 | B2 * | 7/2012 | Ren et al. | 363/21.12 |
| 8,305,004 | B2 * | 11/2012 | Shao | 315/247 |
| 8,363,430 | B2 * | 1/2013 | Ye | 363/21.16 |

* cited by examiner

*Primary Examiner* — Adolf Berhane
*Assistant Examiner* — Lakaisha Jackson
(74) *Attorney, Agent, or Firm* — Perkins Coie LLP

(57) ABSTRACT

The present technology are directed to switching mode power supplies with primary side control. In one embodiment, the switching mode power supply provides an equivalent current signal which represents a load current. The equivalent current signal is then used to control a switching circuit in the switching mode power supply.

20 Claims, 8 Drawing Sheets

SWITCHING MODE POWER SUPPLY WITH PRIMARY SIDE CONTROL

CROSS-REFERENCE TO RELATED APPLICATION(S)

This application claims priority to Chinese Patent Application No. 201010115327.5, filed Jan. 29, 2010, which is incorporated herein by reference in its entirety.

TECHNICAL FIELD

The present disclosure relates generally to switching mode power supplies.

BACKGROUND

The output current of a switching mode power supply can influence the performance of a system, e.g., the brightness of an LED driven by the power supply. Thus, accurate control of the average output current is rather important. FIG. 1 is a prior art switching mode power supply 100 with average current control. As shown in FIG. 1, the switching mode power supply 100 is a flyback converter that receives an AC input signal and provides an output voltage to a load, e.g., LEDs. The switching mode power supply 100 includes a rectifier bridge 101, a transformer 102, a zero-crossing detector 103, an isolated feedback circuit 104, a controller 105, a switching circuit 106, a primary current sense resistor 107-1, and a secondary current sense resistor 107-2. The transformer 101 comprises a primary winding 102-1, a secondary winding 102-2, and an auxiliary winding 102-3. The switching circuit 106 comprises a switch. The switching mode power supply 100 further includes an input capacitor ($C_{IN}$) coupled across the rectifier bridge 101, a diode 108 coupled in series with the secondary winding 102-2 of the transformer 102, and an output capacitor ($C_{OUT}$) coupled between the output port of the switching mode power supply 100 and ground.

The rectifier bridge 101 receives the AC input, and based on the AC input, provides a rectified signal to the primary winding 102-1 of the transformer 102. The primary current sense resistor 107-1 is coupled in series with the switching circuit 108 to provide a primary current signal that represents a current flow through the primary winding 102-1 of the transformer 102 to the controller 105. The secondary current sense resistor 107-2 is coupled in series with the load to provide a secondary current signal that represents a load current. The isolated feedback circuit 104 receives the secondary current signal, and based on the secondary current signal, provides a feedback signal to the controller 105. The zero-crossing detector is coupled in series with the auxiliary winding 102-3 of the transformer 102 to provide a zero detected signal to the controller 105 if a voltage zero-cross of the auxiliary winding 102-3 happens. The controller 105 provides a control signal used to toggle the switch in the switching circuit 106 in response to the primary current signal, the feedback signal, and the zero detected signal. If toggling of the switch in the switching circuit 106 is controlled, the power supplied to the secondary winding 102-2 of the transformer 102 can be adjusted, so that the average current flow through the LED is regulated.

The above control scheme requires an isolated feedback circuit for the secondary current signal, which complicates the circuit structure. In addition, an additional current sense resistor, i.e., the secondary current sense resistor 107-2 is needed, which increases power loss and reduces efficiency.

SUMMARY

In accordance with embodiments of the present technology, a switching mode power supply includes: a transformer having a primary winding, a secondary winding, and an auxiliary winding to supply power to a load; a switching circuit coupled to the primary winding and having a switch coupled to the primary winding to control a current flow through the primary winding; a calculator configured to receive a switching control signal and a current sense signal representing the current flow through the primary winding, to control the switching circuit, and based on the switching control signal and the current sense signal, to provide an equivalent current signal; a zero-crossing detector coupled to the auxiliary winding and configured to provide a zero detected signal when a voltage across the auxiliary winding first crosses zero; and a controller configured to receive the equivalent current signal, the zero detected signal, the current sense signal, and a reference signal, and to provide the switching control signal based thereon.

In accordance with additional embodiments of the present technology, a switching mode power supply includes: a transformer having a primary winding and a secondary winding to supply power to a load; a switching circuit coupled to the primary winding and having a switch coupled to the primary winding to control current flow through the primary winding; a calculator configured to receive a switching control signal used to control the switching circuit and a current sense signal representing the current flow through the primary winding, and to provide an equivalent current signal based on these signals; a detecting capacitor coupled to the primary winding for sensing an oscillation between a magnetizing inductor of the primary winding and a parasitic capacitor of the switching circuit; a zero-crossing detector coupled to the detecting capacitor and configured to provide a zero detected signal in response to a reverse current flow through the detecting capacitor; and a controller configured to receive the equivalent current signal, the zero detected signal, the current sense signal, and a reference signal, and to generate the switching control signal based thereon.

In accordance with further embodiments of the present technology, a switching mode power supply includes: a transformer having a primary winding and a secondary winding to supply power to a load; means for controlling a current flow through the primary winding; means for providing an equivalent current signal in response to a switching control signal and a current sense signal; means for sensing an oscillation between a magnetizing inductor of the primary winding and a parasitic capacitor; means for providing a zero detected signal in response to a first zero-crossing of the oscillation; and means for providing the switching control signal in response to the equivalent current signal, the zero detected signal, the current sense signal, and a reference signal.

In accordance with embodiments of the present technology, a method used in a switching mode power supply includes: coupling a switching circuit to a primary winding of a transformer to store energy when the switching circuit is turned on, and release the energy stored to a secondary winding of the transformer when the switching circuit is turned off; sensing a current flow through the primary winding of the transformer and generating a current sense signal; sensing an oscillation between a magnetizing inductor of the primary winding of the transformer and a parasitic capacitor of the switching circuit; generating a zero detected signal when the oscillation first crosses zero; generating an equivalent current signal in response to a switching control signal and the current sense signal; and generating the switching control signal in response to the equivalent current signal, the zero detected signal, the current sense signal, and a reference signal.

DETAILED DESCRIPTION

Embodiments of circuits and methods for a switching mode power supply are described in detail herein. In the following description, some specific details, such as example circuits for these circuit components, are included to provide a thorough understanding of the technology. One skilled in relevant art will recognize, however, that the technology can be practiced without one or more specific details, or with other methods, components, materials, etc.

Figure 1:
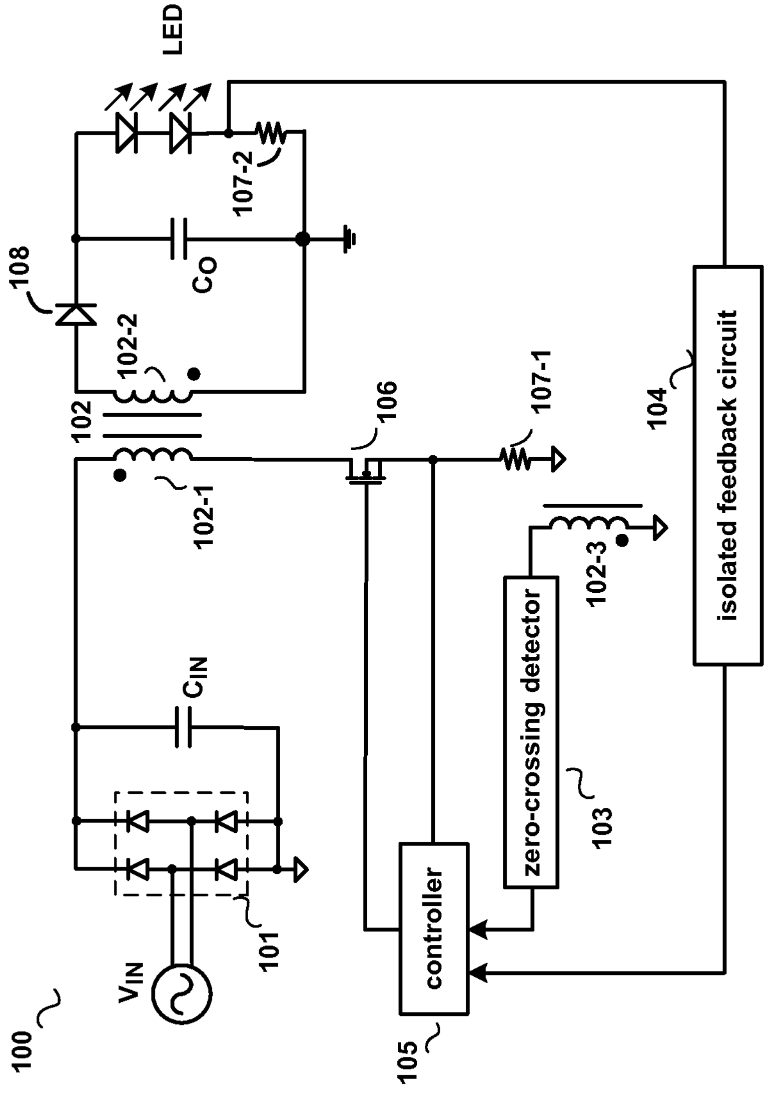
FIG. 1 (Prior Art)
FIG. 1 illustrates a schematic circuit diagram of a prior art switching mode power supply 100.
Figure 2:
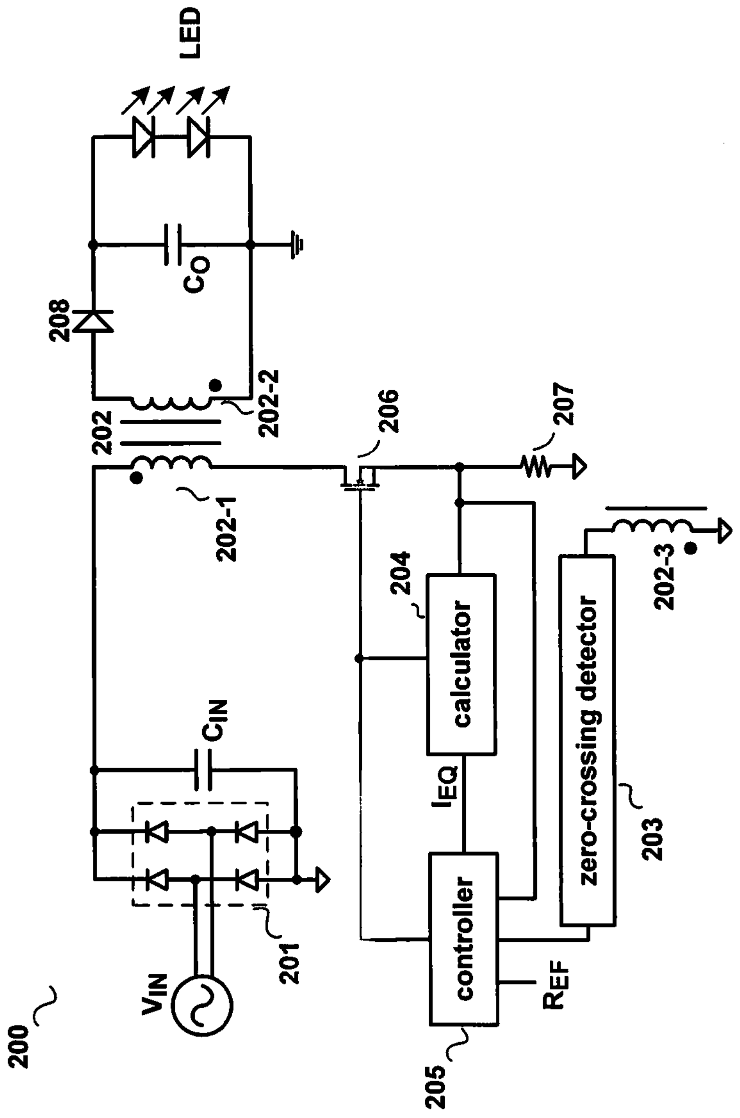
FIG. 2 illustrates a schematic circuit diagram of a switching mode power supply 200 in accordance with an embodiment of the present technology.

FIG. 2 illustrates a schematic circuit diagram of a switching mode power supply 200 in accordance with an embodiment of the present technology. In one embodiment, the switching mode power supply 200 is used in an AC-DC application. However, in other embodiments, the switching mode power supply 200 may be used in DC-DC converters and/or other suitable electric circuits.

As shown in FIG. 2, the switching mode power supply 200 includes a rectifier bridge 201, which is configured to receive an AC input signal ($V_{IN}$), to provide a rectified signal; a transformer 202 coupled to the rectifier bridge 201 for receiving the rectified signal. The transformer 202 has a primary winding 202-1, a secondary winding 202-2, and an auxiliary winding 202-3 to supply power to a load of the switching mode power supply 200. The power supply 200 also includes a switching circuit 206 coupled to the primary winding 202-1 and having a switch coupled to the primary winding 202-1 to control the current flow through the primary winding 202-1; a zero-crossing detector 203 coupled to the auxiliary winding 202-3 to provide a zero detected signal when voltage across the auxiliary winding 202-3 first crosses zero; a calculator 204 coupled to the switching circuit 206 and a controller 205 for receiving a switching control signal and a current sense signal. The switching control signal is used to control the switching circuit, while the current sense signal represents the current flow through the primary winding 202-1. Based on the switching control signal and the current sense signal, the calculator 204 calculates an equivalent current signal ($I_{EQ}$) which represents the load current. The power supply 200 further includes a controller 205 configured to receive the equivalent current signal, the zero detected signal, the current sense signal, and a reference signal ($I_{EQ}$), and based on these signals, the controller 205 provides the switching control signal.

In one embodiment, the switching mode power supply 200 further comprises a current sense resistor 207 coupled in series with the switching circuit 206. The current sense resistor 207 provides the current sense signal to the calculator 204 and the controller 205. However, one skilled in the art should realize that the switching mode power supply 200 may also use the on-resistance of the switching circuit 206 and/or other suitable techniques to provide the current sense signal.

In one embodiment, the switching mode power supply 200 further includes an input capacitor ($C_{IN}$) coupled across the rectifier bridge 201, a diode 208 coupled in series with the secondary winding 202-2, and an output capacitor ($C_{OUT}$) coupled between the output port of the switching mode power supply 200 and secondary side ground. In certain embodiments, the diode 208 may be replaced by a synchronous switch (not shown).

During operation, the switching circuit 206 is turned on when the controller 205 provides a high-level switching control signal. Then the input signal ($V_{IN}$), the rectifier bridge 201, the input capacitor ($C_{IN}$), the primary winding 202-1, the switching circuit 206, and the current sense resistor 207 form a current loop. Accordingly, the current flowing through the switching circuit 206 increases linearly under the effect of a magnetizing inductor of the primary winding 202-1. As a result, the voltage across the current sense resistor 207 increases, i.e., the current sense signal increases.

When the current sense signal which represents the current flow through the primary winding 202-1 increases to a peak current value ($I_{PK}$), the switching control signal turns low. Accordingly, the switching circuit 206 is turned off. Meantime, the voltage across the auxiliary winding 202-3 and the voltage across the secondary winding 202-2 are positive. As a result, the diode 208 is forward biased and on, and the current flow through the diode 208 decreases linearly. Suppose that the turn ratio of the primary winding 202-1 and the secondary winding 202-2 is n:1, the peak current value of the current flow through the diode 208 is believed to be $n \times I_{PK}$. The current flow through the diode 208 decreases from $n \times I_{PK}$. When it decreases to zero, the magnetizing inductor of the primary winding 202-1 and a parasitic capacitor of the switching circuit 206 start to oscillate. The zero-crossing detector 203 detects the oscillation, and generates the zero detected signal when the oscillation first crosses zero. The controller 205 then provides a high-level switching control signal to toggle the switching circuit 206. Then the switching mode power supply 200 enters a new switching cycle, and operates as discussed hereinbefore.

Figure 3:
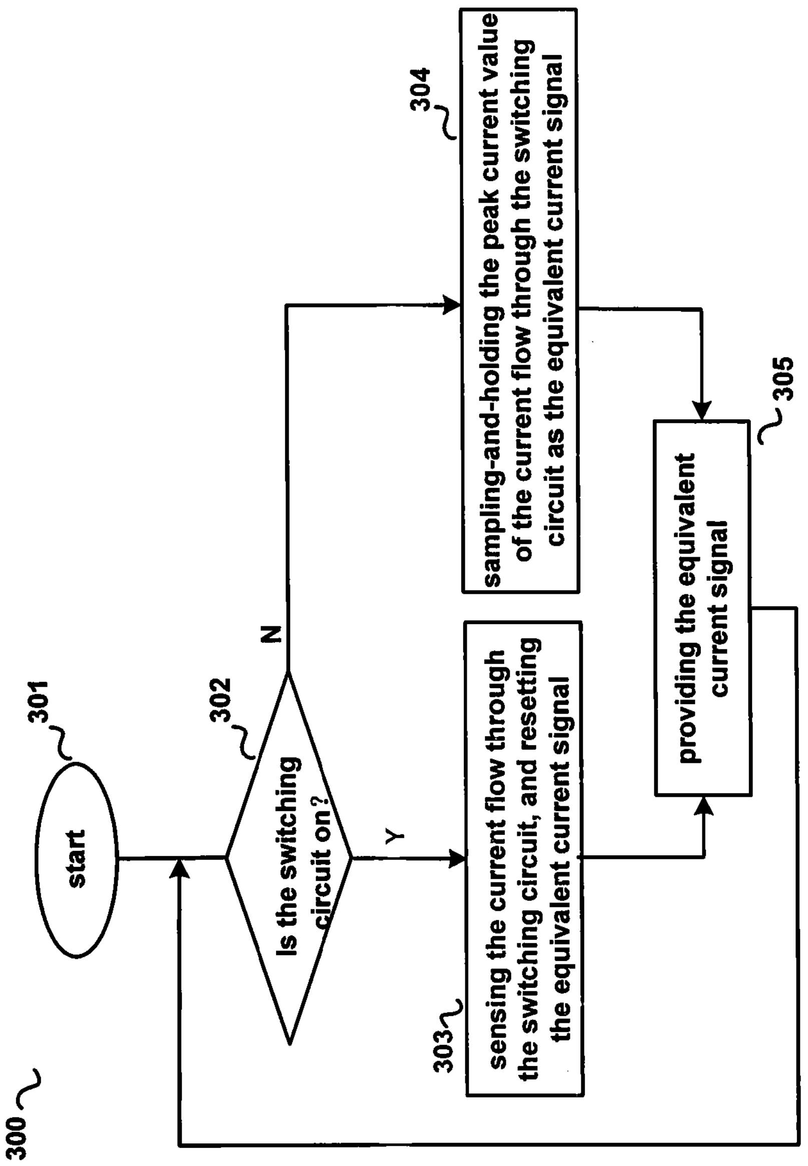
FIG. 3 illustrates a schematic flow chart 300 of the operation of a calculator in accordance with an embodiment of the present technology.

FIG. 3 illustrates a schematic flow chart 300 of a calculator in accordance with an embodiment of the present technology. As shown in FIG. 3, the flow chart 300 comprises: stage 301, start, i.e., toggling the switching circuit; stage 302, detecting the status of the switching circuit, if the switching circuit is on, go to stage 303, if the switching circuit is off, go to stage 304; stage 303, sensing the current flow through the switching circuit, and resetting an equivalent current signal to be zero; stage 304, sampling-and-holding the peak current value of the current flow through the switching circuit as the equivalent current signal; stage 305, providing the equivalent current signal.

Figure 4:
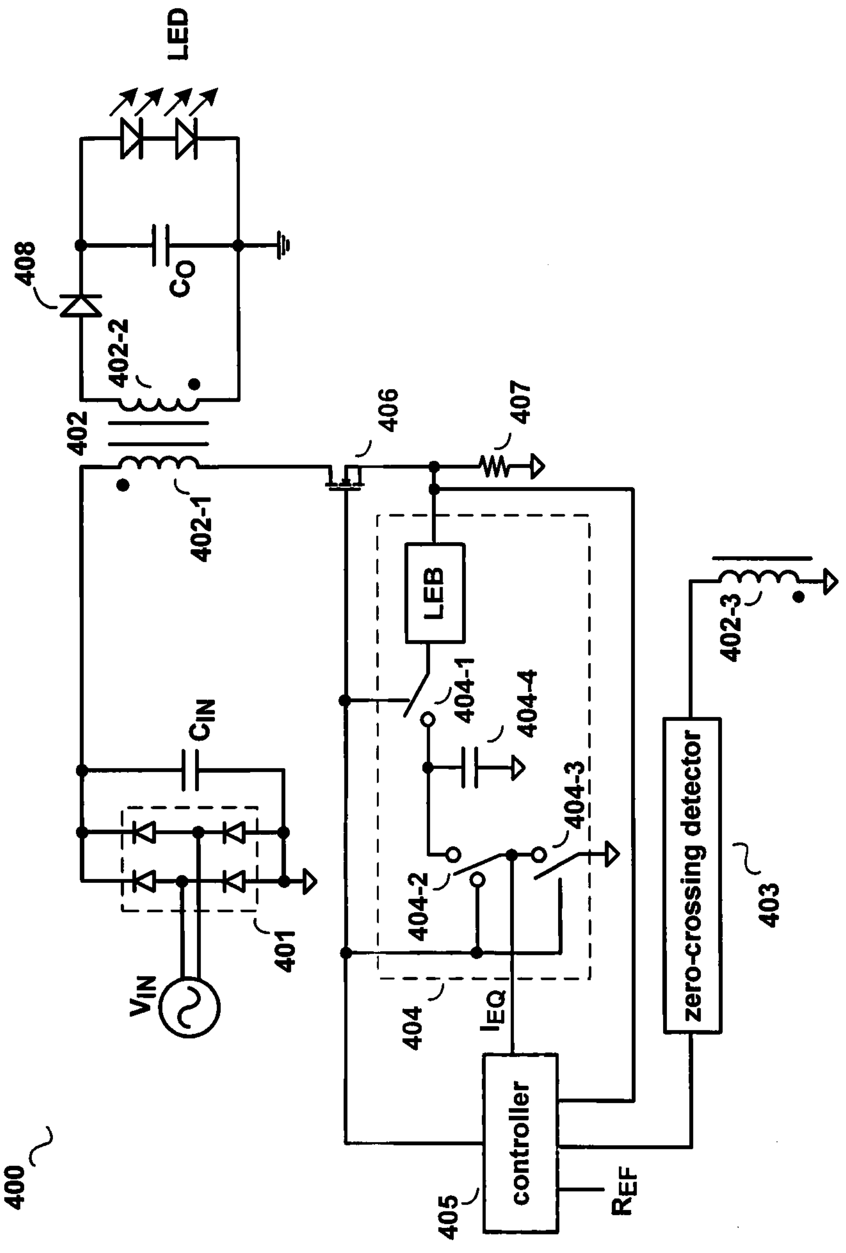
FIG. 4 illustrates a schematic circuit diagram of a switching mode power supply 400 in accordance with an embodiment of the present technology.

FIG. 4 illustrates a schematic circuit diagram of a switching mode power supply 400 which adopts a calculator in accordance with another embodiment of the present technology. As shown in FIG. 4, the detailed schematic circuit of a calculator 404 is illustrated. In one embodiment, the calculator 404 comprises: a first switch 404-1 having a first terminal configured to receive the current sense signal and a second terminal; a first capacitor 404-4 coupled between the second terminal of the first switch 404-1 and the primary side ground; a second switch 404-2 having a first terminal coupled to the second terminal of the first switch 404-1 and a second terminal; a third switch 404-3 coupled between the second terminal of the second switch 404-2 and the primary side ground. The first switch 404-1, the second switch 404-2, and the third switch 404-3 individually have a control terminal coupled to the switching control signal. In one embodiment, when the switching control signal is high, the first switch 404-1 and the third switch 404-3 are on, while the second switch 404-2 is off; when the switching control signal is low, the first switch 404-1 and the third switch 404-3 are off, while the second switch 404-2 is on.

In one embodiment, the equivalent current signal ($I_{EQ}$) is provided at the second terminal of the second switch. The current sense signal is connected to the first capacitor via the first switch 404-1, and the equivalent current signal ($I_{EQ}$) is reset when the switching circuit is turned on; the current sense signal is disconnected to the first capacitor 404-4, and the equivalent current signal ($I_{EQ}$) is connected to the first capacitor when the switching circuit is turned off, so that the value of the equivalent current signal ($I_{EQ}$) is equal to the voltage across the first capacitor. The other parts of the switching mode power supply 400 are generally similar to the switching mode power supply 200 in FIG. 2.

During operation, if the switching control signal is high, the switching circuit 406 is on. Meanwhile, the first switch 404-1 and the third switch 404-3 are on, the second switch 404-2 is off. Accordingly, the equivalent current signal ($I_{EQ}$) is pulled to ground, i.e., being reset. As illustrated hereinbefore, the current sense signal increases linearly under the effect of the magnetizing inductor of the primary winding 402-1 during this time period. Thus the voltage across the first capacitor 404-4 which follows the current sense signal also increases linearly. When it increases to the peak current value ($I_{PK}$), the switching control signal turns low. Accordingly, the first switch 404-1 and the third switch 404-3 are off, and the second switch 404-2 is on. Meanwhile, the switching circuit 406 is off. Thus the equivalent current signal ($I_{EQ}$) is connected to the first capacitor 404-4, i.e., $I_{EQ}=I_{PK}\times R_S$, wherein $R_S$ is the resistance of the current sense resistor 407.

Figure 5:
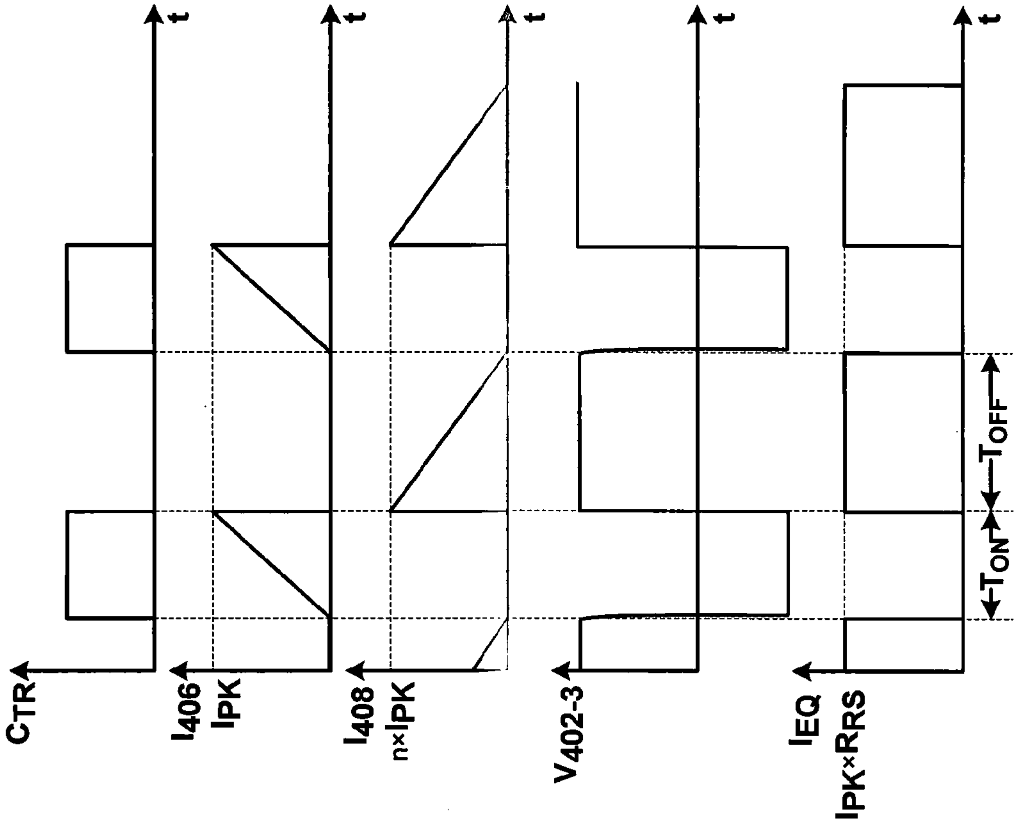
FIG. 5 illustrates waveforms of a switching control signal ($C_{TR}$), a current ($I_{406}$) flow through the switching circuit, a current ($I_{408}$) flow through the diode, a voltage ($V_{402-3}$) across the auxiliary winding, and an equivalent current signal ($I_{EQ}$) in the switching mode power supply 400 of FIG. 4.

FIG. 5 shows example waveforms of the switching control signal ($C_{TR}$), the current ($I_{406}$) flow through the switching circuit, the current ($I_{408}$) flow through the diode, the voltage ($V_{402\text{-}3}$) across the auxiliary winding, and the equivalent current signal ($I_{EQ}$) in the switching mode power supply 400 in FIG. 4. As shown in FIG. 5, the equivalent current signal ($I_{EQ}$) has a peak value $I_{PK}$. The average value ($I_{EQ(AVE)}$) of the equivalent current signal is:

$$I_{EQ(AVE)} = \frac{I_{PK} \times R_{RS} \times T_{OFF}}{T_{ON} + T_{OFF}} \quad (1)$$

while the average value ($I_{D(AVE)}$) of the current flow through the diode 408 is:

$$I_{D(AVE)} = \frac{I_{PK} \times n \times T_{OFF}}{2 \times (T_{ON} + T_{OFF})} \quad (2)$$

wherein $T_{ON}$ is the on time of the switching circuit 406 in one switching cycle, while $T_{OFF}$ is the off time of the switching circuit 406 in one switching cycle. So the average value ($I_{EQ(AVE)}$) of the equivalent current signal is:

$$I_{EQ(AVE)} = \frac{2R_{RS}}{n} \times I_{D(AVE)} \quad (3)$$

As can be seen in equation (3), the average value ($I_{EQ(AVE)}$) of the equivalent current signal is proportional to the average value ($I_{D(AVE)}$) of the current flow through the diode 408 if the resistance of the current sense resistor 407 is given. The DC current flow through the output capacitor ($C_O$) is zero. The average value ($I_{D(AVE)}$) of the current flow through the diode 408 is the average load current. Thus, the equivalent current signal ($I_{EQ}$) is proportional to the average load current. The calculator 104 provides a signal which represents the load current through primary side control.

Figure 6:
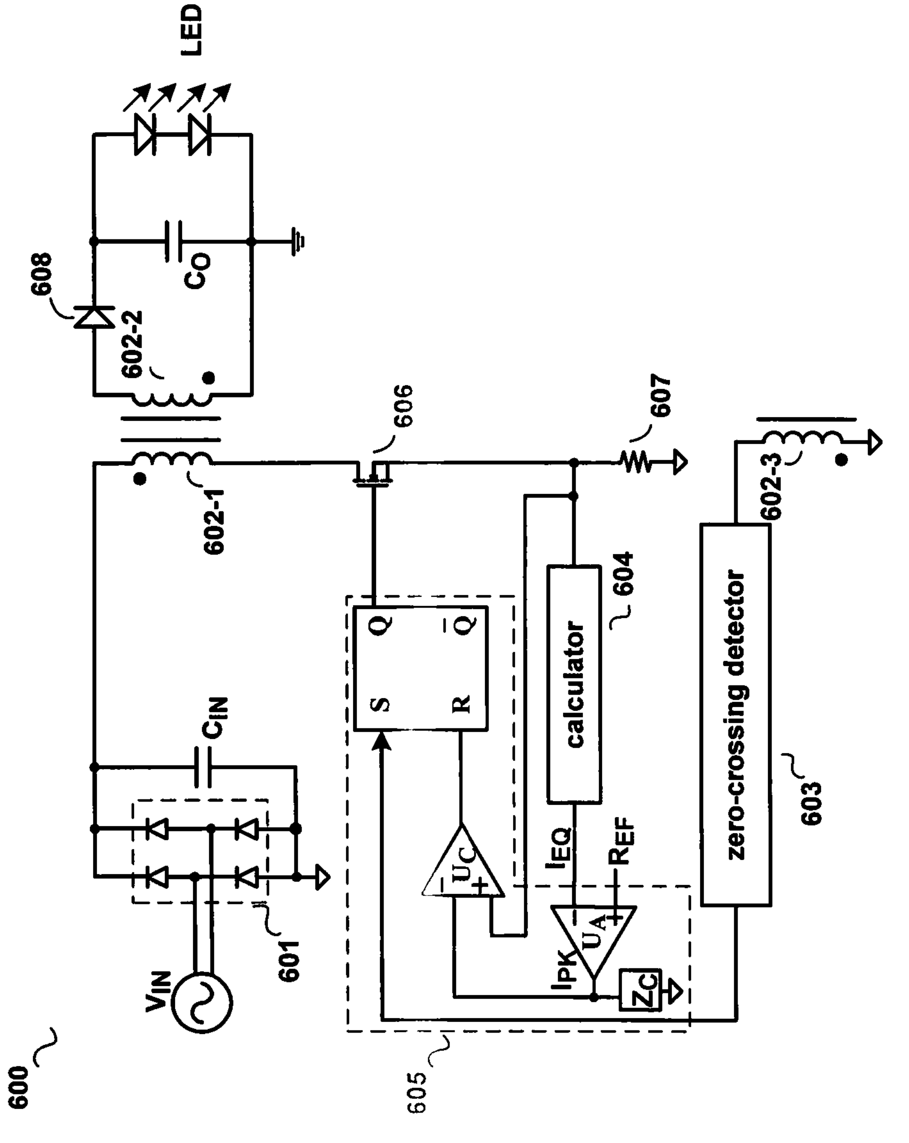
FIG. 6 illustrates a schematic circuit diagram of a switching mode power supply 600 in accordance with an embodiment of the present technology.

FIG. 6 illustrates a schematic circuit diagram of a switching mode power supply 600 in accordance with an embodiment of the present technology. The detailed schematic circuit of a controller 605 is illustrated. Other parts of the switching mode power supply 600 are generally similar to those of the switching mode power supply 200 in FIG. 2, and thus are omitted for clarity.

As shown in FIG. 6, the controller 605 comprises an error amplifier ($U_A$) having a first input terminal and a second input terminal. The first input terminal of the error amplifier is coupled to the calculator for receiving the equivalent current signal ($I_{EQ}$), and the second input terminal of the error amplifier is coupled to a reference signal ($R_{EF}$). Based on the equivalent current signal ($I_{EQ}$) and the reference signal ($R_{EF}$), the error amplifier ($U_A$) provides an error amplified signal. The controller 605 also includes a comparator ($U_C$) having a first input terminal and a second input terminal, the first input terminal of the comparator ($U_C$) is coupled to the error amplifier ($U_A$) for receiving the error amplified signal, and the second input terminal of the comparator ($U_C$) is coupled to the common node of the switching circuit 606 and the current sense resistor 407 for receiving the current sense signal. Based on the error amplified signal and the current sense signal, the comparator ($U_C$) provides a comparison signal. The controller 605 further includes a logical unit having a first input terminal and a second input terminal, and the first input terminal of the logical unit is coupled to the comparator ($U_C$) for receiving the comparison signal, while the second input terminal of the comparator ($U_C$) is coupled to the zero-crossing detector for receiving the zero detected signal. Based on the comparison signal and the zero detected signal, the logical unit provides the switching control signal used to toggle the switching circuit 606.

In one embodiment, the peak current value ($I_{PK}$) comprises the error amplified signal provided by the error amplifier ($U_A$). In one embodiment, the logical unit comprises a RS flip-flop having a reset terminal and a set terminal. The reset terminal of the RS flip-flop receives the comparison signal, and the set terminal of the RS flip-flop receives the zero detected signal. In one embodiment, the controller 605 further comprises a compensated unit ($Z_C$), which is coupled between the output of the error amplifier ($U_A$) and ground, for compensating the error amplified signal.

In operation, the error amplifier ($U_A$) amplifies a difference between the equivalent current signal ($I_{EQ}$) and the reference signal ($R_{EF}$), to generate the amplified signal, i.e., the peak current value ($I_{PK}$). So the peak current value is determined by the equivalent current signal and the reference signal ($R_{EF}$). In one embodiment, the reference signal ($R_{EF}$) is given. As illustrated hereinbefore, the equivalent current signal ($I_{EQ}$) is proportional to the average load current, so the peak current value ($I_{PK}$) is determined by the average load current.

During the on time period of the switching circuit 606, the comparator ($U_C$) provides a high-level comparison signal when the current sense signal reaches the peak current value ($I_{PK}$), which resets the output of the switching control signal. Accordingly, the switching circuit 606 is off. Thus, the time point at which the switching circuit 606 is turned off is determined by the average load current. During the off time of the switching circuit 606, when the voltage across the auxiliary winding 602-3 first crosses zero, the zero-crossing detector 603 outputs the zero detected signal to the logical unit, which sets the switching control signal. Accordingly, the switching circuit 606 is turned on. And the switching mode power supply 600 enters a new switching cycle, and operates as illustrated hereinbefore.

Figure 7:
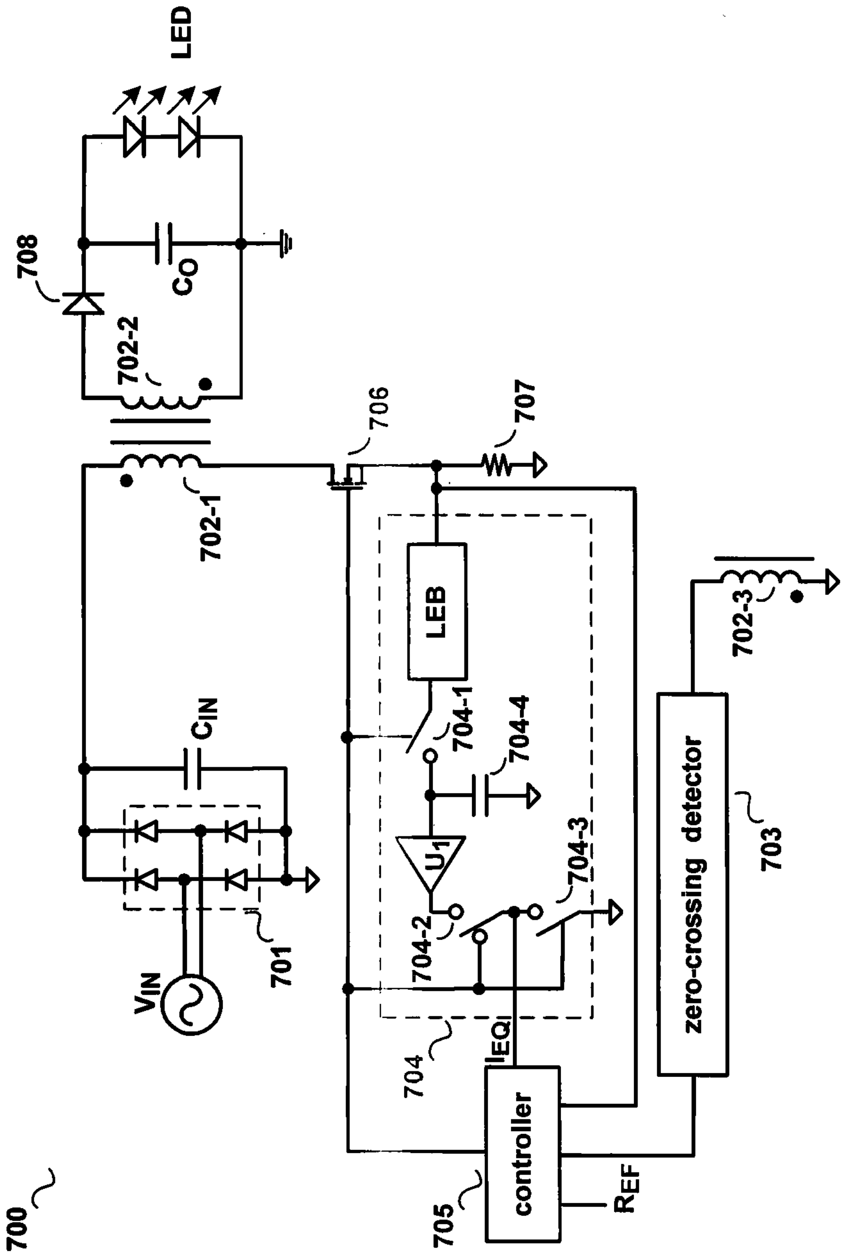
FIG. 7 illustrates a schematic circuit diagram of a switching mode power supply 700 in accordance with an embodiment of the present technology.

FIG. 7 illustrates a schematic circuit diagram of a switching mode power supply 700 in accordance with an embodiment of the present technology. The switching mode power supply 700 in FIG. 7 is generally similar to the switching mode power supply 400 in FIG. 4, except that the calculator 704 in the switching mode power supply 400 further comprises a buffer ($U_1$) for impedance match. The buffer ($U_1$) is coupled between the second switch 704-2 and the common node of the first switch 704-1 and the first capacitor 704-4.

Figure 8:
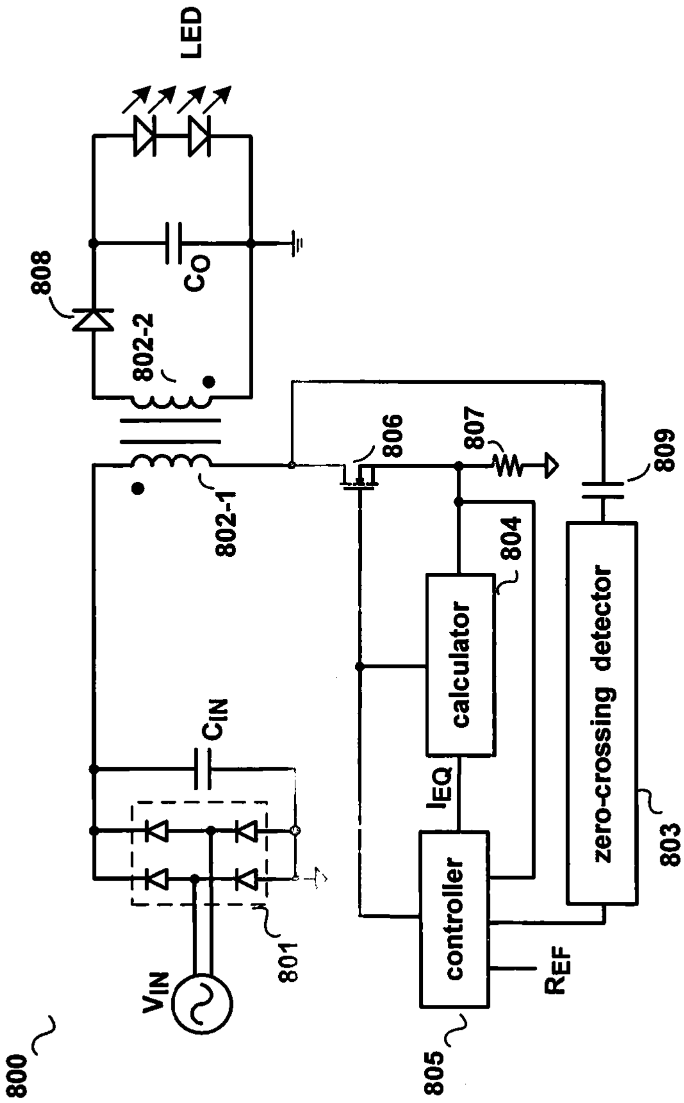
FIG. 8 illustrates a schematic circuit diagram of a switching mode power supply 800 in accordance with an embodiment of the present technology.

FIG. 8 illustrates a schematic circuit diagram of a switching mode power supply 800 in accordance with an embodiment of the present technology. The switching mode power supply 800 in FIG. 8 is generally similar to the switching mode power supply 200 in FIG. 2, except that the switching mode power supply 800 includes a detecting capacitor 809 for sensing oscillation between a magnetizing inductor of the primary winding 802-1 and a parasitic capacitor of the switching circuit 806 in place of the auxiliary winding 202-3 in the switching mode power supply 200. The detecting capacitor 809 has two terminals. The first terminal of the detecting capacitor 809 is coupled to the zero-crossing detector 803, and the second terminal of the detecting capacitor 809 is coupled to the primary winding 802-1.

During operation, when the switching circuit 806 is turned off, a current flowing through the diode 808 decreases from its current value ($n\times I_{PK}$). When it decreases to zero, the magnetizing inductor of the primary winding 802-1 and the parasitic capacitor of the switching circuit 806 start to oscillate. The current flow through the detecting capacitor 808 reverses when the oscillation first crosses zero. Accordingly, the zero-crossing detector 803 detects this zero-crossing, and outputs a high-level zero detected signal to the controller 805, so as to set the switching control signal. Then the switching circuit 806 is turned on, and the switching mode power supply 800 enters a new switching cycle. The operation of the switching mode power supply 800 is generally similar to the switching mode power supply 200.

From the foregoing, it will be appreciated that specific embodiments of the technology have been described herein for purposes of illustration, but that various modifications may be made without deviating from the disclosure. Many of the elements of one embodiment may be combined with other embodiments in addition to or in lieu of the elements of the other embodiments. Accordingly, the disclosure is not limited except as by the appended claims.

We claim:

1. A switching mode power supply, comprising:
- a transformer having a primary winding, a secondary winding, and an auxiliary winding;
- a switching circuit coupled to the primary winding, the switching circuit having a switch coupled to the primary winding to control current flow through the primary winding;
- a calculator configured to receive a switching control signal and a current sense signal, wherein the current sense signal represents a current flow through the primary winding, and wherein based on the switching control signal and the current sense signal, the calculator is configured to provide an equivalent current signal;
- a zero-crossing detector coupled to the auxiliary winding, wherein the zero-crossing detector provides a zero detected signal when a voltage across the auxiliary winding first crosses zero; and
- a controller configured to receive the equivalent current signal, the zero detected signal, the current sense signal, and a reference signal, and to provide the switching control signal to the switching circuit based thereon.

2. The switching mode power supply of claim 1, wherein the calculator comprises:
- a first switch having a first terminal and a second terminal, wherein the first terminal is configured to receive the current sense signal;
- a first capacitor coupled between the second terminal of the first switch and a primary side ground;
- a second switch having a first terminal and a second terminal, wherein the first terminal of the second switch is coupled to the second terminal of the first switch; and
- a third switch coupled between the second terminal of the second switch and the primary side ground; wherein:
  - the first switch, the second switch, and the third switch are controlled by the switching control signal; and
  - the equivalent current signal is generated at the second terminal of the second switch.

3. The switching mode power supply of claim 2, wherein the calculator further comprises a buffer coupled between the second switch and the second terminal of the first switch.

4. The switching mode power supply of claim 2, wherein
- the first switch and the third switch are configured to be turned on, and the second switch is configured to be turned off when the switching control signal is high; and
- the first switch and the third switch are configured to be turned off, and the second switch is configured to be turned on when the switching control signal is low.

5. The switching mode power supply of claim 1, wherein the controller comprises:
- an error amplifier configured to receive the equivalent current signal and the reference signal, and to provide an error amplified signal based thereon;
- a comparator configured to receive the error amplified signal and the current sense signal, and to provide a comparison signal based thereon; and
- a logical unit configured to receive the comparison signal and the zero detected signal, and to provide the switching control signal based thereon.

6. The switching mode power supply of claim 5, wherein the controller further comprises a compensated unit coupled between the error amplifier and the primary side ground.

7. A switching mode power supply, comprising:
- a transformer having a primary winding and a secondary winding;

a switching circuit coupled to the primary winding, the switching circuit having a switch coupled to the primary winding to control current flow through the primary winding;

a calculator configured to receive a switching control signal and a current sense signal, wherein the current sense signal represents a current flow through the primary winding, and wherein based on the switching control signal and the current sense signal, the calculator is configured to provide an equivalent current signal;

a detecting capacitor coupled to the primary winding for sensing an oscillation between a magnetizing inductor of the primary winding and a parasitic capacitor of the switching circuit;

a zero-crossing detector coupled to the detecting capacitor, wherein the zero-crossing detector is configured to provide a zero detected signal in response to a reverse current flow through the detecting capacitor; and a controller configured to receive the equivalent current signal, the zero detected signal, the current sense signal, and a reference signal, and to provide the switching control signal based thereon.

8. The switching mode power supply of claim 7, wherein the calculator comprises:

a first switch having a first terminal and a second terminal, wherein the first terminal is configured to receive the current sense signal;

a first capacitor coupled between the second terminal of the first switch and a primary side ground;

a second switch having a first terminal and the second terminal, wherein the first terminal of the second switch is coupled to the second terminal of the first switch; and a third switch, coupled between the second terminal of the second switch and the primary side ground; wherein:

the first switch, the second switch, and the third switch are controlled by the switching control signal; and the equivalent current signal is provided at the second terminal of the second switch.

9. The switching mode power supply of claim 8, wherein the calculator further comprises a buffer coupled between the second switch and the second terminal of the first switch.

10. The switching mode power supply of claim 8, wherein the first switch and the third switch are configured to be turned on, and the second switch is configured to be turned off when the switching control signal is high; and the first switch and the third switch are configured to be turned off, and the second switch is configured to be turned on when the switching control signal is low.

11. The switching mode power supply of claim 7, wherein the controller comprises:

an error amplifier configured to receive the equivalent current signal and the reference signal, and to provide an error amplified signal based thereon;

a comparator configured to receive the error amplified signal and the current sense signal, and to provide a comparison signal based thereon; and a logical unit configured to receive the comparison signal and the zero detected signal, and to provide the switching control signal based thereon.

12. The switching mode power supply of claim 11, wherein the controller further comprises a compensated unit coupled between the error amplifier and the primary side ground.

13. A switching mode power supply, comprising:

a transformer having a primary winding and a secondary winding;

means for controlling the current flow through the primary winding;

means for providing an equivalent current signal in response to a switching control signal and a current sense signal;

means for sensing an oscillation between a magnetizing inductor of the primary winding and a parasitic capacitor;

means for providing a zero detected signal in response to a first zero-crossing of the oscillation; and means for providing the switching control signal in response to the equivalent current signal, the zero detected signal, the current sense signal, and a reference signal.

14. The switching mode power supply of claim 13, wherein means for providing the equivalent current signal comprises:

means for connecting and disconnecting the current sense signal to a first capacitor, the first capacitor following the current sense signal when the current sense signal is connected, and holding the peak value of the current sense signal when the current sense signal is disconnected;

means for connecting and disconnecting the equivalent current signal to the first capacitor; and means for resetting the equivalent current signal to zero.

15. The switching mode power supply of claim 14, wherein means for providing the equivalent current signal further comprises means for impedance match.

16. The switching mode power supply of claim 13, wherein means for providing the switching control signal comprises:

means for providing an error amplified signal in response to the equivalent current signal and the reference signal;

means for providing a comparison signal in response to the error amplified signal and the current sense signal; and means for providing the switching control signal in response to the comparison signal and the zero detected signal.

17. The switching mode power supply of claim 16, wherein means for providing the switching control signal further comprises means for compensating the error amplified signal.

18. A method used in a switching mode power supply, comprising:

sensing a current flow through a primary winding of a transformer and generating a current sense signal, the transformer having a switching circuit coupled to the primary winding and configured to controllably charge/discharge the primary winding;

sensing an oscillation between a magnetizing inductor of the primary winding of the transformer and a parasitic capacitor of the switching circuit;

generating a zero detected signal when the oscillation first crosses zero;

generating an equivalent current signal in response to a switching control signal and the current sense signal, wherein the switching control signal is coupled to control the switching circuit; and generating the switching control signal in response to the equivalent current signal, the zero detected signal, the current sense signal, and a reference signal.

19. The method of claim 18, wherein generating the equivalent current signal comprises:

resetting the equivalent current signal when the switching circuit is on; and sampling-and-holding a peak current value in the switching circuit as the equivalent current signal when the switching circuit is off.

20. The method of claim 18, wherein generating the switching control signal comprises:

amplifying a difference between the equivalent current signal and the reference signal to generate an error amplified signal;

comparing the error amplified signal with the current sense signal to generate a comparison signal; and setting the switching control signal when the zero detected signal turns high, and resetting the switching control signal when the comparison signal turns high.

* * * * *